Patented Jan. 18, 1944

2,339,318

UNITED STATES PATENT OFFICE 2,339,318

CONDENSATION PRODUCTS DERIVED FROM 4,4'-DIAMINODIPHENYLSULPHONE AND PROCESS OF MAKING THEM

Robert Behnisch and Paul Pöhls, Wuppertal-Elberfeld, Germany, assignors to Winthrop Chemical Company, Inc., New York, N. Y., a corporation of New York No Drawing. Application June 27, 1939, Serial No. 281,362. In Germany November 3, 1937

18 Claims. (Cl. 260—397.6)

This invention relates to condensation products of 4.4'-diaminodiphenylsulphone and to a process of preparing the same.

4.4'-diaminodiphenylsulphone and 4.4'-diacetyldiamino-diphenylsulphone have a good activity against streptococci and pneumococci infections of the mouse, the utility of the 4.4'-diaminodiphenylsulphone for this purpose is however decreased by the fact that the said product gives rise to the formation of methemoglobin.

In accordance with the present invention new products are obtained which show a considerably increased activity when compared with the aforementioned products and which do not further give rise to the formation of methemoglobin. Applicants have found that the condensation products of 4.4'-diaminodiphenylsulphone with aldehydes are free from the disadvantages of the afore-mentioned compounds. The new condensation-products may contain 1 or 2 molecules of the aldehyde which are combined with one or both amino-groups of the 4.4'-diaminodiphenylsulphone. The condensation takes place while splitting off one molecule of water upon each molecule of aldehyde. In general applicants' new condensation products probably have the structure of the so called Schiff's bases, that is, in the condensation product the carbon atom of the aldehyde-group is combined with the amino-group(s) of the diaminodiphenylsulphone by means of a double bond.

In accordance with the present invention the new condensation products are obtainable by heating 4.4'-diaminodiphenylsulphone with an aldehyde. The most various aldehydes have proved useful for this process, for instance, aliphatic aldehydes, aromatic aldehydes, such as aldehydes of the benzene and naphthalene series, furthermore mixed aliphatic aromatic aldehydes and heterocyclic aldehydes. Depending on the activity of the aldehyde-group the condensation products contain one or two aldehyde radicals. Applicants have found that the condensation often may be facilitated by the presence of catalysts; 4.4'-diaminodiphenylsulphone-hydrohalides which sometimes are contained to a slight extent in the 4.4'-diaminodiphenylsulphone of technical manufacture, for instance, have proved operable as such catalysts, furthermore ammonium halides, hydrohalides of tertiary amines, such as triethylamine, pyridine. When using such catalysts other condensation takes place with 2 molecules of the aldheyde; 2 molecules of aldehyde are also condensed in general when the reaction mixture is heated to melting, for instance, to a temperature of about 150 to about 180° C. In other cases it is advisable to heat the reaction mixture in the presence of a solvent, particularly in the presence of an alcohol, such as methyl, ethyl, isoamyl, hexyl, octyl alcohols etc. The condensation can also be effected in stages, for instance, by first using for the condensation a slightly active aldehyde, so that a mono-condensation product is formed which subsequently may be subjected to further condensation with a more active aldehyde or under the more effective reaction conditions referred to above. In this manner also condensation products are obtainable containing two different aldehyde radicals.

The invention is further illustrated by the following examples without being restricted thereto:

*Example 1.*—24.8 grams of 4.4'-diaminodiphenylsulphone are heated to boiling with 30 grs. of cinnamaldehyde in 300 ccs. of alcohol during 15 minutes. The condensation product begins to separate already in the boiling heat. After cooling it is filtered with suction and washed with alcohol and ether. In this way the 4.4'-bis-(cinnamylidenamino)-diphenylsulphone is obtained. It forms light yellow leaflets melting at 236° C. In a corresponding manner there are obtained when using:

Propionaldehyde the 4.4'-bis-propylidenamino-diphenylsulphone melting at 246° C., Benzaldehyde the 4-benzylidenamino-4'-amino-diphenylsulphone melting at 214° C., 4-tolylaldehyde the 4.4'-bis-(4''-methyl-benzylidenamino)-diphenylsulphone melting at 250° C., 2-hydroxybenzaldehyde the 4.4'-bis-(2''-hydroxy-benzylidenamino)-diphenylsulphone melting at 259° C., 4-methoxybenzaldehyde the 4-(4''-methoxy-benzylidenamino)-4'-amino-diphenylsulphone melting at 226° C., 4-chlorobenzaldehyde the 4.4'-bis-(4''-chloro-benzylidenamino)-diphenylsulphone melting at 233° C., 3.4-methylendioxybenzaldehyde the 4-(3''.4''- methylendioxy-benzylidenamino)-4' - amino-diphenylsulphone melting at 227° C.

The melting points of the afore-mentioned condensation-products may be different corresponding to the state of purity of the starting material; a further purification of the products often is not possible because of their insolubility in organic solvents.

The condensation often is favourably influenced by using technical diaminodiphenylsulphone which still contains some small quantities of its dihydrochloride. In this case, for instance, with 3.4-methylendioxy-benzaldehyde directly the 4.4' - bis - (3''.4'' - methylendioxybenzyliden - amino)-diphenylsulphone is obtained, melting at 231° C.

In the same manner also other aldehydes, for instance, β-hydroxypropionaldehyde, glycerolaldehyde, crotonaldehyde, valerianaldehyde, butyraldehyde, chaulmoogrylaldehyde, nitrobenzaldehydes, vanillin, acetyl- or benzoylaminobenzaldehyde, phenylacetaldehyde, resorcinolaldehyde, phloroglucinaldehyde, terephthalic aldehyde-acid, 1-hydroxynaphthalene-4-aldehyde, 2-hydroxynaphthalene-1-aldehyde, furfurol, α-furylacrolein, pyridine-3-aldehyde, 2-methyl-indol-3-aldehyde, quinoline-2-aldehyde may be reacted.

*Example 2.*—10 grams of 4.4'-diaminodiphenylsulphone and 25 grams of 4-chlorobenzaldehyde are heated to 170–180° C. while slowly passing through a current of nitrogen until the water split off during the condensation is distilled off which takes about 10 minutes. The cold melt is triturated and boiled with ether whereby the 4.4'-bis-(4''-chlorobenzylidenamino) - diphenylsulphone remains undissolved. It is sucked off; it melts at 233° C. The yield amounts to 90% of the theory.

In the same way when using benzaldehyde there is obtained the 4.4'-bis-benzylidenamino-diphenylsulphone melting at 236° C., when using 4-methoxybenzaldehyde the 4.4'-bis-(4''-methoxy-benzylidenamino)-diphenylsulphone melting at 241° C.

*Example 3.*—10 grams of the 4-(4''-methoxy-benzylidenamino) - 4' - amino-diphenylsulphone melting at 226° C. obtained as per Example 1) are heated to 170–180° C. with 20 grams of 4-methoxybenzaldehyde while slowly passing through a current of nitrogen until the reaction-water is distilled off. The melt is poured into hot alcohol while stirring the precipitate filtered with suction and washed with alcohol and ether. The 4.4' - bis - (4'' - methoxybenzylidenamino) - diphenylsulphone obtained forms colorless crystals melting at 240° C.

*Example 4.*—24.8 grams of 4.4'-diaminodiphenylsulphone and 36 grams of d-glucose are heated to boiling under reflux for 24 hours in 300 ccs. of methanol, whereupon the glucose gradually dissolves. A test of the reaction mixture is then completely soluble in water also after evaporation of the methanol. The reaction solution is filtered, the solvent evaporated, the residue treated with absolute methanol and the solution evaporated once more. The residue, oily in the beginning, is dissolved in methanol, the solution boiled up for a short time with charcoal, filtered and the filtrate slowly treated with alcohol and ether. Thereupon the condensation product from 2 mols of glucose with 1 mol of 4.4'-diaminodiphenylsulphone precipitates as a white powder. The new compound is easily soluble in water with neutral reaction, difficultly soluble in alcohol and insoluble in ether; it turns the polarized light to the left.

In a corresponding manner there is obtained by reacting 4.4'-diaminodiphenylsulphone:

(a) With d-arabinose a condensation product of 2 mols of d-arabinose with 1 mol of 4.4'-diaminodiphenylsulphone as a white powder, which is easily soluble in water and turns the polarized light slightly to the left;

(b) With galactose a white powder being readily soluble in water and turning the polarized light to the left;

(c) With mannose a white powder being readily soluble in water, turning the polarized light strongly to the left.

*Example 5.*—12 grams of 4.4'-diaminodiphenylsulphone are heated to boiling with 35 grams of maltose and 0.2 gram of ammoniumchloride in 200 ccs. of alcohol for 6 hours. On working up as described in Example 1 a condensation product is obtained from 1 mol of 4.4'-diaminodiphenylsulphone with 2 mols of maltose as a white powder which is readily soluble in water and turns the polarized light to the right. Instead of ammonium-chloride hydrohalides of tertiary amines, particularly lower aliphatic tertiary alkyl amines, such as trimethylamine, triethylamine, triethanolamine, or of heterocyclic tertiary amines, such as pyridine and quinoline, may be used as catalyst.

*Example 6.*—6 grams of 4.4'-diamino-3.3'-dimethoxy-diphenylsulphone are heated to boiling with 14 grams of maltose in 100 ccs. of methanol for 30 hours. The reaction solution is worked up as described in Example 1. A white powder is obtained being readily soluble in water. The polarized light is turned to the right.

By a corresponding reaction of 4.4'-diamino-3.3'-dimethyl-diphenylsulphone with glucose or maltose also white powders are obtained being readily soluble in water.

This is a "continuation in part"-application to our copending application for Letters Patent Ser. No. 237,278, filed October 27, 1938, which has since been abandoned.

What we claim is:

1. The process which comprises reacting upon 4.4'-diamino-diphenylsulphone by heating it with an aldehyde in the presence of a catalyst selected from the group consisting of 4.4'-diamino-diphenylsulphone-hydrohalides, inorganic ammoniumhalides, lower alkyl and alkanol tertiary amine-hydrohalides and heterocyclic amine hydrohalides.

2. Process as claimed in claim 1 in which the reaction mixture is heated to melting.

3. Process as claimed in claim 1 in which the reaction mixture is heated to boiling in the presence of an alkyl alcohol.

4. The process which comprises reacting upon 4.4'-diamino-diphenylsulphone by heating it with an aliphatic aldehyde in the presence of a catalyst selected from the group consisting of 4.4'-diamino-diphenyl sulphone-hydrohalides, inorganic ammonium halides, lower alkyl and alkanol tertiary amine-hydrohalides and heterocyclic amine-hydrohalides.

5. The process which comprises reacting upon 4.4'-diamino-diphenyl sulphone with an aliphatic aldehyde in the presence of a catalyst selected from the group consisting of 4.4'-diamino-diphenyl sulphone-hydrohalides, inorganic ammonium halides, lower alkyl and alkanol tertiary amine-hydrohalides and heterocyclic amine-hydrohalides, while heating the reaction mixture to boiling in the presence of an alkyl alcohol.

6. The process which comprises reacting upon 4.4'-diamino-diphenyl sulphone by heating it with a hydroxy aldehyde in the presence of a catalyst selected from the group consisting of 4.4'-diamino-diphenyl sulphone-hydrohalides, inorganic ammonium halides, lower alkyl and alkanol tertiary amine-hydrohalides and heterocyclic amine-hydrohalides.

7. The process which comprises reacting upon 4.4'-diamino-diphenyl sulphone with a hydroxy aldehyde in the presence of a catalyst selected from the group consisting of 4.4'-diamino-diphenyl sulphone-hydrohalides, inorganic ammonium-halides, lower alkyl and alkanol tertiary amine-hydrohalides and heterocyclic amine-hydrohalides, while heating the reaction mixture to boiling in the presence of an alkyl alcohol.

8. The product, p,p'-di-(phenylallylidenamino)-diphenyl sulphone having the following formula

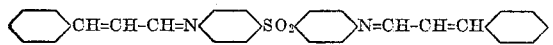

9. A diaminodiphenylsulphone derivative having the formula

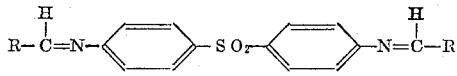

where R is that portion of an aldehyde molecule RCHO which is normally attached to the aldehyde functional grouping —CHO.

10. A diaminodiphenylsulphone derivative as set forth in claim 9 in which RCHO is an aromatic aldehyde.

11. A diaminodiphenylsulphone derivative as set forth in claim 9 in which RCHO is an aromatic hydroxyaldehyde.

12. A diaminodiphenylsulphone derivative having the formula

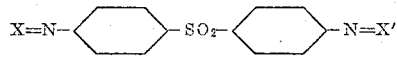

in which X and X' are the same and represent that portion of an aldehyde molecule which is normally attached to the carbonyl oxygen.

13. 4.4'-bis(2''-hydroxy-benzylidenamino)-diphenylsulphone.

14. A diaminodiphenylsulphone derivative having the formula:

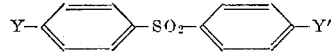

where Y is $RHC=N-$, Y' is a member of the class consisting of $-NH_2$ and $-N=CHR$, and R is the organic portion of an aldehyde molecule RCHO which is normally attached to the aldehyde functional group —CHO.

15. A diaminodiphenylsulphone derivative as set forth in claim 9 in which RCHO is an aliphatic aldehyde.

16. A diaminodiphenylsulphone derivative as set forth in claim 14 in which RCHO is an aromatic aldehyde.

17. A diaminodiphenylsulphone derivative as set forth in claim 14 in which RCHO is an aromatic hydroxyaldehyde.

18. A diaminodiphenylsulphone derivative as set forth in claim 14 in which RCHO is an aliphatic aldehyde.

ROBERT BEHNISCH.
PAUL PÖHLS.